United States Patent [19]
Loov

[11] 3,837,625
[45] Sept. 24, 1974

[54] WEDGE MEMBER
[75] Inventor: Nils Gösta Loov, Ersmark, Sweden
[73] Assignee: Looveverken Raufoss AB
[22] Filed: Feb. 23, 1973
[21] Appl. No.: 335,386

Related U.S. Application Data
[63] Continuation of Ser. No. 131,608, April 6, 1971, Pat. No. 3,734,549.

[30] Foreign Application Priority Data
Apr. 23, 1970 Sweden.............................. 5660/70

[52] U.S. Cl................ 254/104, 312/140, 52/753 G, 403/409, 403/27
[51] Int. Cl............................................. B66f 13/00
[58] Field of Search.......... 52/753 C, 753 D, 753 G, 52/753 K, 758 C, 758 H; 254/104; 248/223; 403/409, 374, 367–371, 339, 340, 276, 277; 108/101, 111; 297/440

[56] References Cited
UNITED STATES PATENTS

| | | | |
|---|---|---|---|
| 988,481 | 4/1911 | Matthews............................ | 403/368 |
| 1,433,814 | 10/1922 | Grady.................................. | 403/277 |
| 2,772,596 | 12/1956 | Trussell....................... | 52/753 G UX |
| 3,437,060 | 4/1969 | Giambalvo....................... | 108/101 X |

*Primary Examiner*—Jordan Franklin
*Assistant Examiner*—Wayne L. Shedd
*Attorney, Agent, or Firm*—Fred C. Philpitt

[57] ABSTRACT

A wedge member which is constructed so that it is easy to observe when the wedge has been driven in sufficiently far to establish the desired rigidity of the wedge connection.

1 Claim, 3 Drawing Figures

PATENTED SEP 24 1974　　　3,837,625
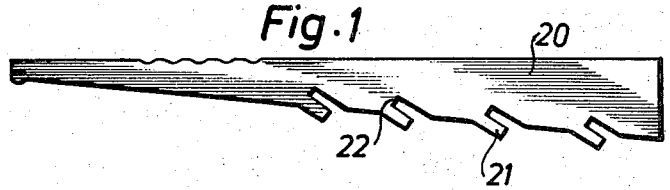
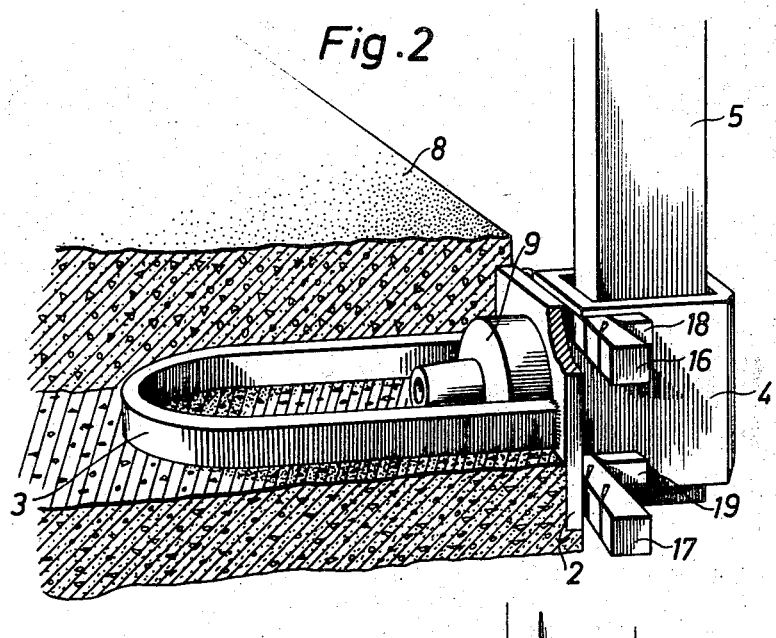
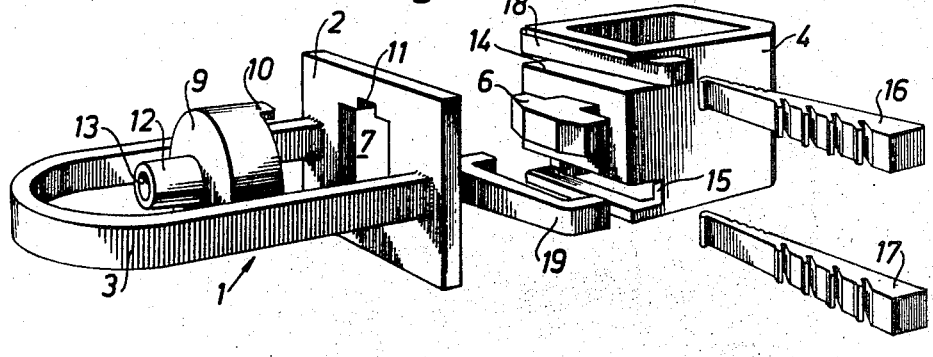

WEDGE MEMBER

RELATED APPLICATION

This is a continuation of my copending application S.N. 131,608, filed Apr. 6, 1971, now U.S. Pat. No. 3,734,549.

THE PRESENT INVENTION

Considered from one viewpoint, my invention is directed to an elongated wedge member that in overall configuration has a gradually increasing width dimension, said wedge member being characterized in that at least one wedge surface is provided with an alternating sequence of a. rearwardly extending projections each of said projections extending outwardly from said wedge surface at an acute angle with respect to said wedge surface and b. recesses disposed along said same wedge surface, each of said recesses being located immediately behind and inwardly of a projection.

With this construction, when the wedge member is forced into a narrow opening, at least some of said projections will be sequentially deformed inwardly into the recess immediately rearwardly thereof so that there is a clear indication as to when the wedge member has been driven in sufficiently far to establish the required rigidity of the wedge connection.

My wedge offers the advantage of providing in a simple manner both a reliable "sight" and "feel" indication of the moment when the wedge has been driven sufficiently far into the intended space. In other words, during the insertion of the wedge, the force which has to be applied thereto in order to cause a continued movement of the wedge into said space will increase suddenly when the deformable projections have been completely forced into the recesses provided behind them. This sudden change in the required impact force is of such a magnitude that a worker will easily observe it and thus automatically obtain a signal that the wedge has been driven in sufficiently far.

The invention will be described, by way of example, with reference to its application on a fastening device for balcony railings, banisters, bridge railings and the like. Reference is made to the accompanying drawings in which:

FIG. 1 is a side elevation of a wedge according to the present invention;

FIG. 2 is a perspective view, on a reduced scale and partly in section, of a fastening device utilizing two wedges of the kind illustrated in FIG. 1; and FIG. 3 is an exploded perspective view of the fastening device shown in FIG. 2.

The fastening device shown in FIGS. 2 and 3 comprises a body portion 1 which is adapted to be secured to a fixed part of a building and has a rectangular front plate 2 and a U-shaped anchorage element 3 welded to the front plate 2 and extending from the rear side thereof. Reference numeral 4 designates a member of substantially rectangular cross-section which is intended to receive and serve as a mounting socket for a substantially vertical post 5 of a railing. On its side facing the body portion 1 the socket 4 has a projecting coupling member 6 having in plan view a substantially T-shaped profile and serving to connect the socket 4 to the body portion 1 in such a manner that the socket can pivot through a small arc about the outer laterally extending flanges of the coupling member 6. As shown in FIG. 3, the front plate 2 is provided with a rectangular opening 7 through which the wider outer portion of the coupling member 6 can be inserted when the socket 4 has been turned 90° from its position shown in the drawing. The flanges of the coupling member 6 can then be brought into engagement with the rear bearing surface of the front plate 2 by turning the socket 4 back to its illustrated position.

In order to secure the required space for the coupling member 6 of the socket 4 when casting the concrete floor 8 one may use a cylindrical sleeve 9 which may be fixed in position together with the body portion. At its forward edge said sleeve 9 has two diametrically opposed projecting teeth 10. These teeth are arranged to be inserted into recesses 11 in the two shorter edges of the opening 7 in the front plate 2. At its rear end the sleeve 9 has an elongation 12 of reduced diameter provided with a threaded through bore 13 serving to make it possible to mount the body portion 1 in a mould board by means of a threaded bolt passing through the front plate 2 and the sleeve 9.

At its side facing the body portion 1 the socket 4 has two grooves 14 and 15 disposed on opposite sides of the coupling member 6 and each arranged to receive one locking wedge 16 and 17, respectively, and one wedge-shaped insert 18 and 19, respectively, having a wedge angle corresponding to the profile of the wedges.

As can be seen from FIG. 3, the wedges 16 and 17 have the same shape as the wedge 20 shown in enlarged scale in FIG. 1. This wedge has on one wedge surface thereof alternating projections 21 and recesses 22. This shape of the wedge 20 is intended to facilitate and ensure that the wedge is inserted sufficiently far in the respective wedge receiving space to cause the required rigidity of the wedge connection formed. An indication that the wedge has been driven in sufficiently far is achieved when the projections 21 have been forced completely into the respective recesses 22, as the impact force applied on the wedge will then, even when considerably increased, not cause any substantial continued movement of the wedge into the wedge receiving space. A suitable material for the wedge is aluminum such as AA6063 (according to U.S. standards).

As can be seen in FIG. 1, the surface of the wedge which is opposite to the surface containing the alternating sequence of projections and recesses may be corrugated or waffled. This helps insure the frictional engagement of the wedge member with the receiving space for the wedge member.

What I claim is:

1. An elongated wedge member that in overall configuration has a gradually increasing width dimension, said wedge member being characterized in that one wedge surface is provided with an alternating sequence of a. rearwardly extending projections each of said projections extending outwardly from said wedge surface at an acute angle with respect to said wedge surface and b. recesses disposed along said same wedge surface, each of said recesses being located immediately behind and inwardly of a projection, whereby when said wedge member is forced into a narrow opening at least some of said projections will be sequentially deformed inwardly into the recess immediately rearwardly thereof so that there is a clear indication as to when the wedge member has been driven in sufficiently far to establish the required rigidity of the wedge connection.

* * * * *